(12) United States Patent
Hisatake et al.

(10) Patent No.: US 6,300,929 B1
(45) Date of Patent: Oct. 9, 2001

(54) FLAT PANEL DISPLAY DEVICE

(75) Inventors: Yuzo Hisatake, Kanagawa-ken; Takashi Nakamura, Saitama-ken, both of (JP)

(73) Assignee: Kabushiki Kaisha Toshiba, Kanagawa (JP)

( * ) Notice: Subject to any disclaimer, the term of this patent is extended or adjusted under 35 U.S.C. 154(b) by 0 days.

(21) Appl. No.: 09/221,168

(22) Filed: Dec. 28, 1998

(51) Int. Cl.$^7$ ........................................... G09G 3/36
(52) U.S. Cl. ........................ 345/94; 345/87; 349/18; 349/97; 349/119
(58) Field of Search ........................... 345/87, 88, 89, 345/90, 91, 92, 93, 94, 95, 96, 97, 98, 99; 349/18, 97, 119

(56) References Cited

U.S. PATENT DOCUMENTS

| | | | | |
|---|---|---|---|---|
| 4,984,874 | * | 1/1991 | Yamamoto | 350/334 |
| 5,751,384 | * | 5/1998 | Sharp | 349/18 |
| 5,953,083 | * | 9/1999 | Sharp | 349/18 |
| 6,057,901 | * | 5/2000 | Xu | 349/121 |
| 6,169,590 | * | 1/2001 | Abileah et al. | 349/120 |

\* cited by examiner

*Primary Examiner*—Richard Hjerpe
*Assistant Examiner*—Jean Lesperance
(74) *Attorney, Agent, or Firm*—Pillsbury Winthrop LI; Intellectual Property Group

(57) ABSTRACT

A flat panel display device includes a polarizer, a polarized light reflection layer made of a cholesteric liquid crystal layer, a fixed retarder layer to delay an incident light phase by $\lambda/4$, and a variable retarder layer to shift an incident light phase by $\lambda/2$ in response to applied voltages. The fixed and variable retarder layers are held between the polarizer and the polarized light reflection layer. A retardation plate and a second polarizer are disposed behind the polarized light reflection layer to transform incident light into a circularly polarized light component of which rotation direction is the same as that of the circularly polarized light selectively reflected from the polarized light reflection layer. The flat panel display device is used as reflection type and semi-transmission type displays with high light efficiency of light utilization and high brightness as well as low power consumption.

18 Claims, 5 Drawing Sheets

FLAT PANEL DISPLAY DEVICE

BACKGROUND OF THE INVENTION

This invention relates to a flat panel display device in which a passive display element such as a liquid crystal display element or the like is used and, more particularly, to an outer (ambient) light reflection type flat panel display device.

Since liquid crystal display devices (LCDs) are optically passive elements, the LCDs need illumination light sources for image display. One of the most important requirements for the LCDs is lower power consumption which primarily depends on such illumination light sources. In order to meet that requirement, reflection type and semi-transmission light type liquid crystal display devices (LCD) have been developed. Since the reflection type LCD uses outer (ambient) light as an illumination light source, its display screen becomes dark in some circumstances due to lack of illuminance. Thus, it does not work usefully in a dark place.

The semi-transmission light type LCD, on the other hand, is provided with an illumination light source and a semi-transmission light (half) mirror to reflect outer (ambient) light so that it can be used as a transmission type LCD in dark circumstances while as a reflection type LCD under sufficiently illuminated conditions. The semi-transmission light mirror in the latter, however, is 50% at maximum efficiency of outer light utilization. Its screen illuminance is significantly poor in comparison with that of the transmission type or even reflection type LCDs.

Improvement of such a technical difficulty has been recently attempted for a semi-transmission light type LCD in which a plurality of pin-holes for each pixel are provided in a reflection plate and micro-lenses are correspondingly provided for each pin hole. In this LCD, since outer (ambient) light beams reflected from the reflection plate except the pin-holes are utilized while light beams passing through the micro-lenses are collected as a light-transmission type LCD when a light source disposed at the rear of the LCD is operated, its optical efficiency becomes better. When, however, the outer light beams are utilized, an optical loss takes place at the pin-holes. As a result, this LCD is often used as the light-transmission type and its power consumption is not always saved. Further, it is necessary to additionally install the reflection plate in the device from its outside to avoid an otherwise complicated structure. The reflection plate of this kind causes a parallax effect that decreases display performance.

Still another reflection type LCD is also under development. This reflection type LCD includes a front illumination light source which consists of a light guide provided on the observer side and a linear light source provided on a side edge of the light guide. Conspicuous light reflection on the front surface of the LCD, however, causes unsatisfactory display dignity, e.g., poor contrast.

SUMMARY OF THE INVENTION

An object of the present invention is to provide a flat panel display device with a novel structure to overcome such technical difficulties in conventional reflection type or semi-transmission light type liquid crystal display devices as set forth above.

Another object is to provide a flat panel display device with high optical efficiency.

A flat panel display device of the invention is characterized in such a structure that a first polarizer, a first retarder plate, a polarized light reflection layer, a second retardation plate, and a second polarizer are laminated in that order viewed from the observer side. The polarized light reflection layer made of cholesteric liquid crystals selectively reflects left-handed or right-handed circularly polarized light components selected from light incident on its primary surface on the front side, and transmits its remains (right-handed or left-handed circularly polarized light components).

As shown in FIG. 2, where the cholesteric liquid crystal in the polarized light reflection layer 18 has a left-handed (counterclockwise) helical structure, a left-handed circularly polarized component L1 derived from natural (ambient) light Lf incident on the primary surface 18f reflects on the surface 18f. A right-handed circularly polarized component L1 passes through the polarized light reflection layer 18. Similarly, a left-handed circular polarized component L2' from natural incident light Lb reflects on the primary surface 18b. A right-handed circularly polarized component L1' with respect to its advancing direction passes through the polarized light reflection layer 18. As mentioned above, the circularly polarized light component substantially reflects on the cholesteric liquid crystal when a rotating direction of the former is consistent with a helical direction of the latter while the reversed component passes through the latter. If the cholesteric liquid crystal layer is made thin, the circularly polarized component with the consistent rotating direction with the helical direction passes by 10% through the cholesteric liquid crystal layer and selectively reflects thereon by 90%.

In a flat panel display device of the present invention, when light is incident from an observation surface, a linearly polarized light component which oscillates along a polarization axis of a polarizer comes out and reaches to a variable retarder. The retarder consists of fixed and variable retarder layers. The former preferably delays a phase of a specific-direction oscillating component derived from incident light by $\lambda/4$ ($\lambda$: an incident light wavelength) with respect to a reference oscillating component which crosses at right angles the specific-direction oscillating component. The latter also preferably delays, in response to a supplied voltage, a phase of a specific-direction oscillating component derived from incident light by $\lambda/2$ with respect to a reference oscillating component which crosses the specific-direction oscillating component at right angles.

A well known $\lambda/4$ retardation plate, for instance, can be used as such a fixed retarder layer. The $\lambda/4$ retardation plate has a delay axis which defines 45° in a predetermined direction with respect to the polarizer. The retardation plate transforms the linearly polarized component passing through the polarizer into a circularly polarized component with a specific rotation direction. When the phase axis of the retardation plate is disposed at 45° in the right-handed direction, an outgoing circularly polarized component becomes right-handed (clockwise). When, on the other hand, the phase axis of the retardation plate is disposed at 45° in the left-handed direction, an outgoing circularly polarized component becomes left-handed (counterclockwise).

A variable retarder may be a birefringence layer which is controlled by voltages to change incident light phases. A vertical alignment homogeneous (VA) liquid crystal layer, for instance, is used as such a variable retarder layer. The VA liquid crystal layer has a negative dielectric anisotropy. When a lower voltage (first voltage) than a threshold value is applied to the VA liquid crystal layer, i.e., the VA liquid crystal layer maintains its initial vertical alignment to the substrate, the incident light is not subject to a phase modulation and passes through the VA liquid crystal layer. Its circular polarization remains unchanged. When a higher voltage (second voltage) than a saturated voltage is applied to the VA liquid crystal layer of which molecules are horizontally aligned to the substrate, an oscillation component of the incident light in a specific direction is delayed by a $\lambda/2$ phase with respect to the other component thereof in a cross-nichol direction with the specific direction. As a result, its circular polarization direction is reversed.

As set forth above, the variable retarder layer composed of the liquid crystal causes a $\lambda/2$ relative phase delay between the two separate occasions when the first and second voltages are applied to the layer. In the case of the VA liquid crystal layer, for instance, the first voltage is defined as a voltage applied to the layer of which alignment is in its initial condition, while the second voltage is defined as a voltage applied to the VA liquid crystal layer of which alignment is in parallel with the substrate.

Since the rotation direction of circularly polarized light is not controllable by a liquid crystal with high rotary power, an electrically controlled birefringence (ECB) mode liquid crystal is suitable for the variable retarder. Additionally, a twisted nematic liquid crystal, if properly twisted in angle, sufficiently performs the birefringence function.

A flat panel display device may consist of a first $\lambda/4$ retardation plate, for instance, of which phase delay axis crosses a polarization axis at about 45° in the right-handed rotation (clockwise) direction, a VA liquid crystal layer provided behind the retardation plate, a left-handed helical cholesteric liquid crystal layer disposed behind the retardation plate, and a second retardation plate and a second polarizer provided behind the cholesteric liquid crystal layer. Linearly polarized light reaching to the first retardation plate from the front surface side of the display device is transformed into right-handed circularly polarized light through the first retardation plate.

When the VA liquid crystal layer is supplied with the second voltage and is in the turned-on state, the layer transforms right-handed circularly polarized light into left-handed circularly polarized light, which reaches to the polarized light reflection layer. Based on the principle shown in FIG. 2, the polarized light reflection layer selectively reflects a left-handed circularly polarized component. This left-handed circularly polarized light is again transformed into right-handed circularly polarized light through the VA liquid crystal layer. The right-handed circularly polarized light reaches to the retardation plate which, in turn, outputs linearly polarized light. The linearly polarized light oscillates in the same direction as the incident linearly polarized light. The incident light from the rear surface of the display device is transformed into such a circularly polarized component through the second polarizer and the second retardation plate that it selectively reflects on the polarized light reflection layer (the left-handed circularly polarized light in the above case). About 10% of this component passes through the polarized light reflection layer and reaches to the VA liquid crystal layer. The VA liquid crystal layer transforms the same into right-handed circularly polarized light. The right-handed circularly polarized light comes to the first retardation plate. The first retardation plate transforms it into a linearly polarized light which oscillates in the same direction as the linearly polarized incident light.

When the VA liquid crystal layer is supplied with the first voltage and is in the turned-off state, right-handed circularly polarized light incident from the front surface of the display device and going out of the retardation plate maintains its rotation direction. The right-handed circularly polarized reaches to and passes through the polarized light reflection layer. Further, the light is transformed into a linearly polarized light through the second retardation plate. The linearly polarized light is absorbed by the second polarizer. About 10% of the left-handed circularly polarized light from the rear side of the display device passes through the VA liquid crystal layer and the polarized light reflection layer. It is transformed, through the first retardation plate, into a linearly polarized light that oscillates in a direction crossing the polarization axis of the, polarizer. This linearly polarized light is absorbed by the first polarizer. With this structure, the flat panel display device is capable of concurrently functioning as the reflection type display utilizing outer light (incident light from the polarizer) and as the transparent type display by means of the illumination light source.

In addition, when the delay axis of the retardation plate is disposed to define about counterclockwise 45° with respect to the polarization axis, the helical direction of the cholesteric liquid crystal layer is set to be in the right-handed circular (clockwise) direction so that the same functions can be achieved.

The illumination light source may be a surface light source which consists of a light guide made of a transparent plate, such as an acrylic plate, and a linear light source provided at the side end of the light guide. If an optically scattering reflection layer is disposed on the rear surface of the light guide, polarized components reflected from the polarized light reflection layer repeatedly reflect between the polarized light reflection layer and the scattering reflection layer until their circularly polarized components pass through the polarized light reflection layer. Thus, the utilization efficiency of light from the linear light source is made quite high although the slight loss is caused by absorption of the scattering reflection layer.

The above-stated and other objects and technical features of this invention will become apparent from the following description when taken with the accompanying drawings. It will be understood, however, that the drawings are for purposes of illustration and are not to be construed as defining the scope of the invention, reference being had for the latter purpose to the claims appended hereto.

DESCRIPTION OF PREFERRED EMBODIMENT

Figure 1A:
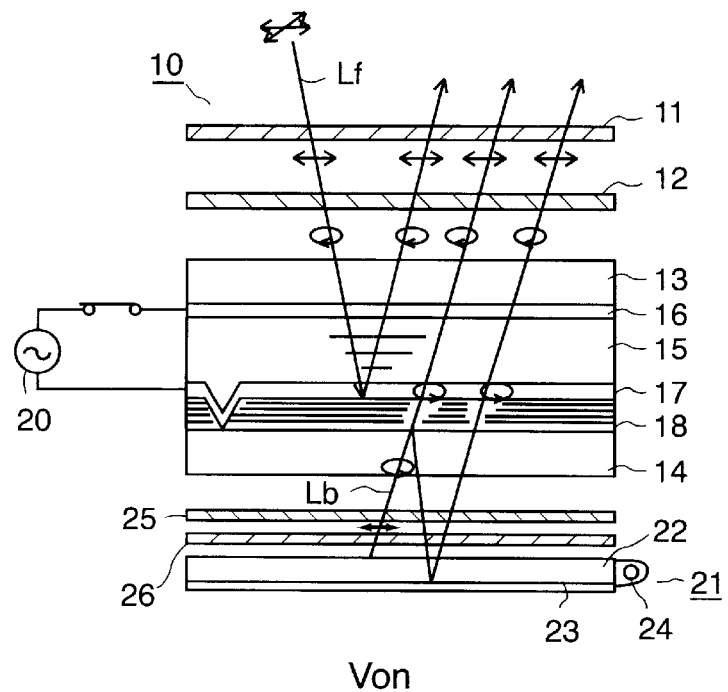
FIG. 1 is a schematic sectional view to explain operations of a first embodiment of the present invention in which FIG. 1(a) and (b) show Von (turned-on) and Voff (turned-off) states, respectively.

FIG. 1 schematically shows a sectional view of a flat panel display device 10 according to a first embodiment of the present invention. A polarizer 11 is disposed on an observation side of the flat panel display device. A λ/4 retarder plate 12 is provided under the polarizer 11 (λ: an incident light wavelength). Underneath the retarder plate 12, a vertical alignment homogeneous (VA) liquid crystal layer 15 is disposed. A pair of glass substrates 13 and 14 hold the VA liquid crystal layer 15. Transparent electrodes 16 and 17 are coated on inner walls of the glass substrates 13 and 14, respectively. A power source 20 is connected to the electrode 16 through a switch and to the electrode 17 to drive the VA liquid crystal layer 15. Alignment layers, not shown, are applied on the inner surface of the electrodes 16 and 17, respectively.

Figure 2:
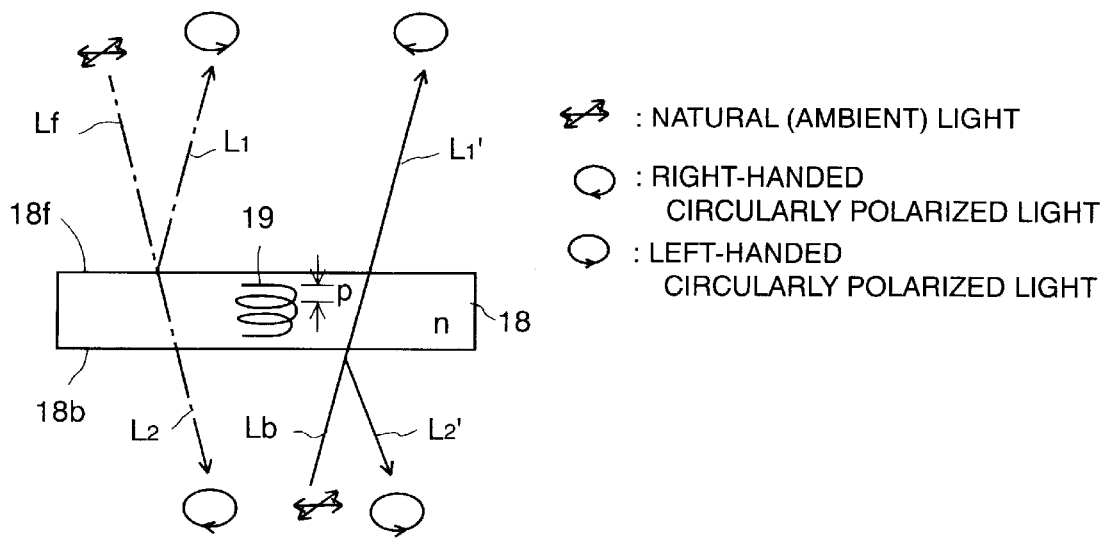
FIG. 2 is a schematic diagram to show the operation principle of a polarized light reflection layer of the invention.

A polymerized retarder film 18 of cholesteric liquid crystals is formed between the glass substrate 14 and the electrode 17. Such cholesteric liquid crystals are disclosed as a broad band polarizer in U.S. Pat. No. 5,506,704 issued to Broer et al. on Apr. 9, 1996. FIG. 2 shows optical transmission or reflection behaviors with respect to the film 18. The cholesteric liquid crystal is selected to comply with the following requirement: p (helical pitch)×n (average refractive index)=λ (an incident light wavelength). When the cholesteric liquid crystal molecules in the retarder film 18 have a structure of a left-handed (counterclockwise) helix, a left-handed circularly polarized component of incident light Lf selectively reflects on the film 18 but its remaining components pass through the film 18. If the value (n×P) of cholesteric liquid crystals is equal to the incident light wavelength λ, the liquid crystals have a function to reflect, ideally by 100% but actually about 90%, a circularly polarized component of which circularly polarized (left-handed or right-handed) direction is equivalent to a helical (left-handed or right-handed) direction of the liquid crystals. Incident light Lb is subject to the same optical behavior in which only a left-handed circularly polarized component selectively reflects on the cholesteric liquid crystal film 18.

Figure 1B:
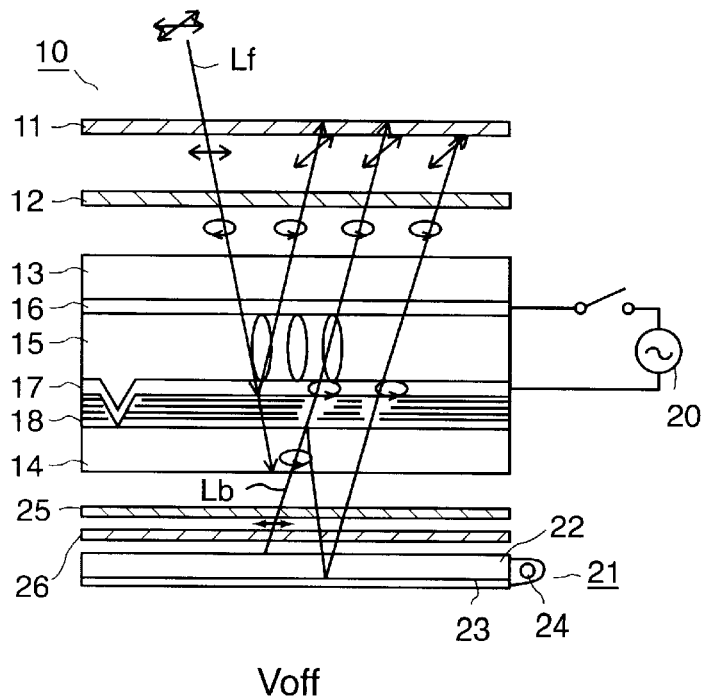

Operations of the flat panel display device will be described hereinafter with reference to FIGS. 1(a) and 1(b) FIG. 1(a) shows the turned-on (Von) state. In this state, the VA liquid crystal layer 15 is supplied with a voltage from the power source 20 which is higher than a threshold level of the VA liquid crystal layer 15. Thus, the liquid crystal molecules are substantially aligned in parallel with the substrates 13 and 14.

The incident light Lf from the upper observation side is transformed into right-handed circularly polarized light through the polarizer 11 and the λ/4 retarder plate 12. The right-handed circularly polarized light is incident on the VA liquid crystal layer 15 through which it is delayed in phase by λ/2 and is transformed into left-handed circularly polarized light. This left-handed circularly polarized light reaches to the polarized light reflection layer, i.e., the cholesteric liquid crystal layer 18. As described above, the left-handed circularly polarized light is substantially reflected by the cholesteric liquid crystal layer 18. The reflected polarized light is again delayed in phase by λ/2 through the VA liquid crystal layer 15 so that it is transformed into right-handed circularly polarized light. This light passes again through the λ/4 retarder plate 12 by which it is transformed into linearly polarized light. Since the polarization axis of the linearly polarized light is along that of the polarizer 11, the linearly polarized light passes through the polarizer 11. Thus, a clear-state display is obtained on the screen.

FIG. 1(b) shows the turned-off (Voff) state. In this state, the VA liquid crystal layer 15 is supplied with a voltage (zero voltage inclusive) from the power source 20 which is lower than the threshold level of the liquid crystal layer 15. Thus, this liquid crystal molecules are driven to be in homogeneous alignment in the vertical direction from the upper substrate to the lower substrate. The incident light is not subject to a phase modulation.

In this condition, the incident light Lf from the upper is transformed into right-handed circularly polarized light through the polarizer 11 and the λ/4 retarder plate 12 in the same manner as shown in FIG. 1(a). The right-handed circularly polarized light is incident on the VA liquid crystal layer 15. But the right-handed circularly polarized light is not subject to a phase modulation at the VA liquid crystal layer 15 so that it remains unchanged. Thus, the right-handed circularly polarized light reaches to the cholesteric liquid crystal layer 18. This right-handed circularly polarized light passes through the cholesteric liquid crystal layer 18 and is transformed into linearly polarized light of which oscillation component is along the absorption axis of the polarizer 26 through the retardation plate 25. As a result, light does not return to the observation surface and a dark-state display appears on the screen.

Next, operations of a surface light source 21 disposed behind the cholesteric liquid crystal layer 18 will be explained hereinafter. The surface light source 21 includes a light guide 22 made of an acrylic plate, a linear light source 23 provided at the side end of the light source 22, and a diffusing reflection layer 24 mounted behind the light guide 22.

In the turned-on (Von) state as shown in FIG. 1(a), light Lb coming from the surface light source 21 is transformed, through the polarizer 26 and the retardation plate 25, into left-handed circularly polarized light. Some (10%) of the left-handed circularly polarized light passes through the cholesteric liquid crystal layer 18 while the remaining reflects its from the cholesteric liquid crystal layer 18. The light passing through the cholesteric liquid crystal layer 18 reaches to the VA liquid crystal layer 15, which phase-modulates the same and transforms it into right-handed circularly polarized light. This light passes through the λ/4 retarder plate 12, which transforms it into linearly polarized light. Since the polarization axis of the linearly polarized light is consistent with that of the polarizer 11, the linearly polarized light passes through the polarizer 11. Thus, a clear-state display is represented on the screen.

In the turned-off (Voff) state as shown in FIG. 1(b), left-handed circularly polarized light Lb observed from the side of the polarizer passes through the cholesteric liquid crystal layer 18. The light passing through the cholesteric liquid crystal layer 18 reaches to the VA liquid crystal layer 15. The liquid crystal layer 15 does not phase-modulate the same but merely outputs it. This light passes through the λ/4 retarder plate 12, which transforms it into linearly polarized light. Since the polarization axis of the linearly polarized light crosses that of the polarizer 11 at right angles, the linearly polarized light is absorbed by the polarizer 11. Thus, a dark-state display is obtained on the screen.

Thus, the flat panel display device is capable of performing a quite high light-utilization efficiency and clear-state display in the application of both the outer (ambient) light and the illumination light source to the display device.

The cholesteric liquid crystal layer 18 may be disposed in the VA liquid crystal layer 15 to improve a parallax effect which the substrate 14 causes in the case of the above-described structure of the polarized light reflection layer disposed on the substrate 14. The polarized light reflection layer 18 may be commonly used as an insulation layer for electronically active elements, such as thin film transistors and metal-insulation-metal (MIM) diodes. With that usage of the polarized light reflection layer 18, the production process of the flat panel display device can be simplified and its production cost can be reduced with that additional application of the polarized light reflection layer 18 to the active elements.

Thus, the flat panel display device is capable of functioning as the light reflection type display utilizing outer (ambient) light and as the light transparent type display by means of the illumination light source.

Although the VA liquid crystal element is used as a variable retarder in the embodiment, it may be substituted for other kinds of nematic liquid crystal elements or different devices which modulate incident light by a λ/2 phase shift or does not do modulate the incident light in response to electric fields applied to them. They are, for instance, a conventional horizontal alignment type nematic liquid crystal elements in which nematic liquid crystal molecules are aligned in parallel with its substrate, or a twisted nematic liquid crystal element.

The present invention can be applied to a color display device. Such a color display device includes a color filter of complementary three primary colors which consists of red, green, and blue colors or yellow, magenta, and cyan colors and is disposed between the polarizer and the liquid crystal layer, and pixel electrodes arranged in a matrix. A color display is carried out by means of an additive color mixing method in which each pixel is controlled in response to the electric fields. The color filter may be provided in the cell of the variable retarder (liquid crystal cell).

In order to obtain a monochrome white and black or superior color reproducible display, the polarized light reflection layer used in the flat panel display device of the invention is, preferably, required to have substantially the same functions and operations as described above with respect to all the wavelengths in the visible light region. In the case, for example, where the polarized light reflection layer is made of cholesteric liquid crystal polymer layer like the above-described embodiments, the polarized light reflection layer can meet requirements for the entire visible light region if its helix pitch "p" continuously varies in the thickness ("d") direction in order for the retardation index Δand to cover the visible light region from the shortest wavelength through the longest one.

Since the cholesteric liquid crystal has the helix structure of stick-like polymers, light of which wavelength is equal to the helix pitch reflects, i.e., the Bragg reflection takes place if light in parallel with the helix axis is incident on the liquid crystal. The Bragg reflection emerges in a bandwidth (wavelength range) equal to "np+Δnd" (the retardation index "Δnd" plus a central wavelength "np", n : average refractive index of the cholesteric liquid crystal). The birefringence "Δn" represents the difference between the refractive index "n⊥" along the longer axis of the stick-like polymer molecule and the refractive index "n∥" along its shorter axis. The average refractive index "n" is given by the following: n= $\sqrt{n_{\parallel}^2 + n_{\perp}^2}$.

Since, at the present, the birefringence "Δn" of the available cholesteric liquid crystal ranges only from 0 to 0.3 while its available average refractive index "n" ranges from 1.4 to 1.6, the central wavelength of the Bragg reflection is difficult to meet that of the visible light wavelength (about 550 nm). Thus, the effective method to achieve good polarized light reflection over the entire visible region is that the helix pitch of the cholesteric liquid crystal varies in the thickness direction.

One of suitable methods to comply with that requirement is that more than two kinds of cholesteric liquid crystals with different helical pitches are continuously laminated. Another method is that additive materials (e.g., nematic liquid crystals with an infinite helical pitch) to make the helical pitch of cholesteric liquid crystal longer are coated on their surface before solidifying the cholesteric liquid material coated on the substrate.

In the flat panel display device of the embodiments, it is also possible to display half tones by providing the variable retarder with intermediate voltages between the first and second voltages "Von" and "Voff".

The flat panel display device achieves high light utilization efficiency both in the cases where it functions as the light reflection type display utilizing outer (ambient) light and as the light transparent type display by means of the illumination light source.

Figure 3:
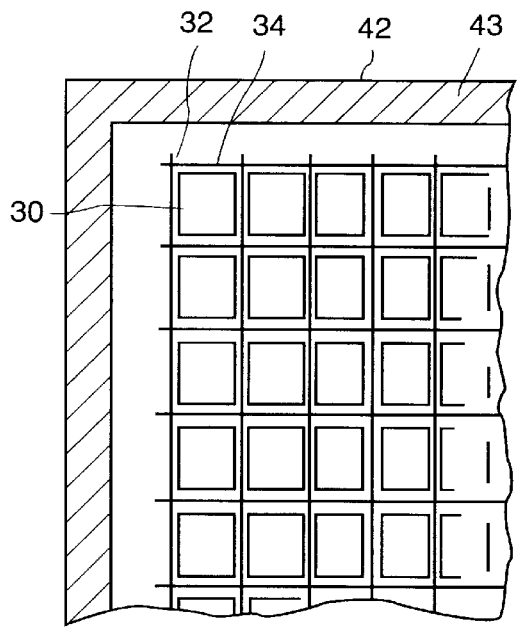
FIG. 3 is a partial plane view of the second embodiment the invention.
Figure 4:
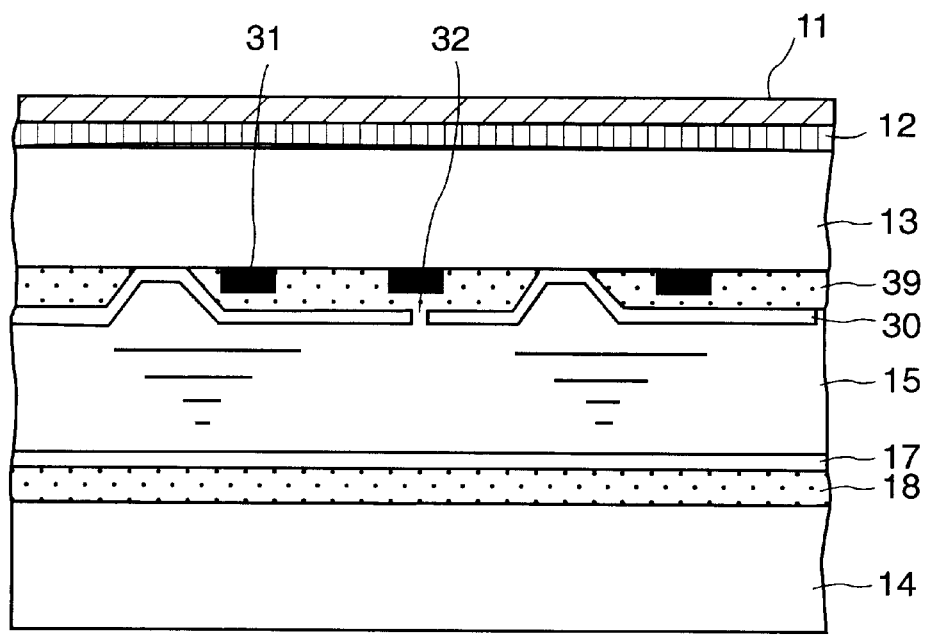
FIG. 4 is a partial sectional view of the second embodiment of the invention.
Figure 5:
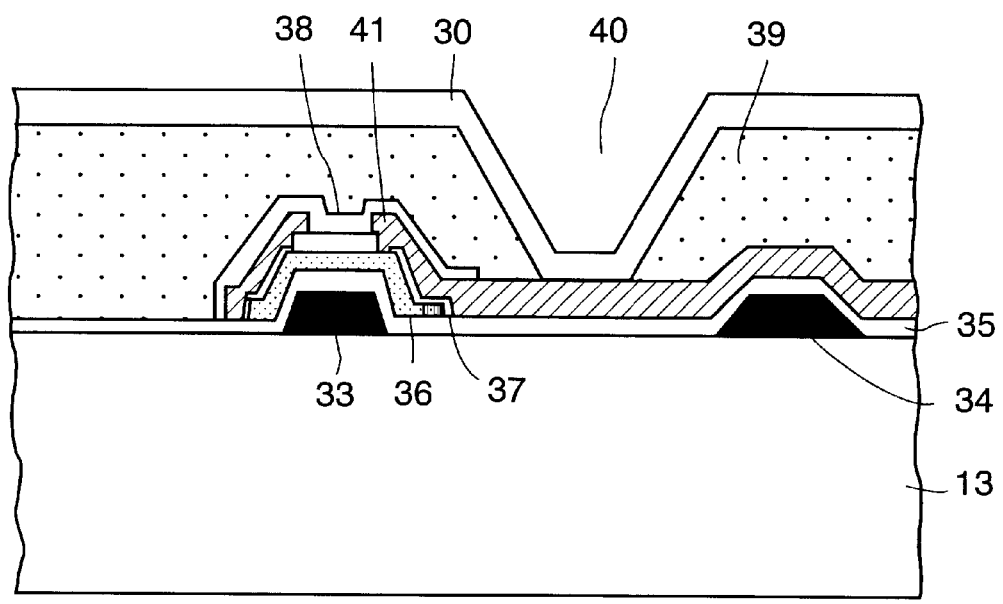
FIG. 5 is a partial sectional view of a thin film transistor in the second embodiment of the invention.

FIG. 3 shows the structure of a thin film transistor (TFT) active matrix type liquid crystal display device according to a second embodiment of the present invention in which the display device is used as a semi-transmission type. FIGS. 4 and 5 show essential components of the liquid crystal display device and its thin film transistor array substrate, respectively. The structure shown in FIG. 5 is upside-down with respect to that shown in FIG. 4 for the sake of explanation. It should be noted, however, that a liquid crystal layer and a counter substrate are not shown in FIG. 5.

The TFT active matrix type liquid crystal display device includes pixel electrodes 30 disposed in a matrix form in a display region, TFTs 31 (see FIGS. 4 and 5) to switch and drive the pixel electrode 30, signal lines 32 disposed between the pixel electrodes 30, scanning lines 34, gate electrodes 33 connected to the scanning lines 34, storage capacitors (not shown) connected to the pixel electrodes 30, a peripheral sealing portion 42, and a sealing material 43. With reference to FIGS. 4 and 5, TFT array and counter substrate 13 and 14 are made of a transparent insulation material such as glass. As shown in FIGS. 4 and 5, the TFT array and counter substrate 13 and 14 are provided on the observation and illumination light sides, respectively. A VA liquid crystal layer 15 is held between the TFT array and counter substrates 13 and 14. A thermally oxidized insulation layer 35 is formed on the array substrate 13, the gate electrodes 33 and scanning lines 34. The TFT 31 is further formed with multiple layers of an amorphous semiconductor layer 36 and low electric resistance semiconductor (ohmic contact) layer 37, source and drain electrodes 41, and a passivation layer 38.

Since the gate electrode 33 is disposed under the semiconductor layer 36, the TFT is called the bottom gate structure. In this structure, incident light coming from the array substrate 13 is blocked by the gate electrode 31 and does not substantially reach to the semiconductor layer 36. It prevents the display device from declining in display contrast due to ambient light leakage currents in the open air use.

The display region is entirely covered with a color filter 39 in which a square contact hole 40 with a side about 10 μm long is provided at each pixel. On the color filter 39 a transparent pixel electrode 30 made of an indium tin oxide (ITO) material is coated at each pixel. The transparent pixel electrode 30 is connected to the source electrode 41 of the TFT 31.

A border of the transparent pixel electrode 30 is provided with the signal line 32 (see FIG. 3), the scanning line 34 or the storage capacitor. With this structure, light coming from an illumination light source (not shown) is prevented from leaking and declining in display contrast when the flat panel display device operates as a semi-transmission type and uses transmission light from the illumination light source. Further, an alignment layer (not shown) with a predetermined alignment axis is entirely coated on the array.

On the other hand, a polarized light reflection layer 18 is formed on the counter substrate. The reflection layer 18 is made of a polymerized cholesteric liquid crystal film. The reflection layer 18 is covered with a counter electrode 17 made of an ITO transparent and electrically conductive layer. It is preferable to form and pattern simultaneously the ITO counter electrode by carrying out a masked sputtering process. It substantially eases a process load for the cholesteric liquid crystal at the time when the ITO is formed.

Another alignment layer (not shown) is coated on the counter electrode 17 and is subject to an alignment process. The alignment is to make liquid crystal molecules substantially vertical to the substrate. The array and counter substrates are provided opposite to each other to make cells.

The peripheral edges 42 (see FIG. 3) of the substrates are put together by the sealing materials 43. The liquid crystal material is then injected into the cells. It is desirable to apply the sealing material on the peripheral edges where the polarized light reflection layer 18 of the counter substrate 14 is not formed. Since adhesion of the sealing material to the reflection layer is usually bad, the substrate possibly peals off during a long period of time, 10,000 hours or more. There is fear to cause a reliability problem. If an overcoat material with proper adhesion to the sealing material, however, is applied on the reflection layer, such a reliability problem can be avoided. The overcoat material is acrylic resin, for instance, which is used for a color filter.

As shown in FIGS. 1(a) and 1(b), the λ/4 plate 12 and the polarizer 11 are laminated on the array substrate 13 in that order. The illumination light source 21 is provided on the rear side of the counter substrate 14. In the case of a middle or larger size flat panel display device with 8-inches for longer diagonal display length, an optical diffusion film may be attached to the outer side of the array substrate 13 to enlarge viewing angles.

The flat panel display device of this embodiment is driven by electronic circuits (not shown). When the display device is used in sufficient ambient light, it functions as the reflection type display device.

When the flat panel display device, however, is used in a dark situation, the illumination light source is turned on to function as the transparent type display device.

Figure 6:
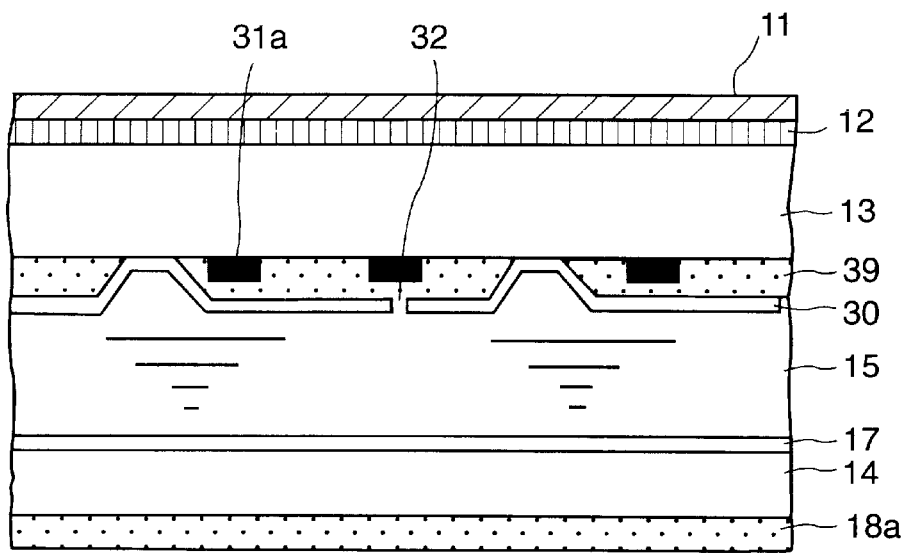
FIG. 6 is a partial sectional view of a third embodiment of the invention.
Figure 7:
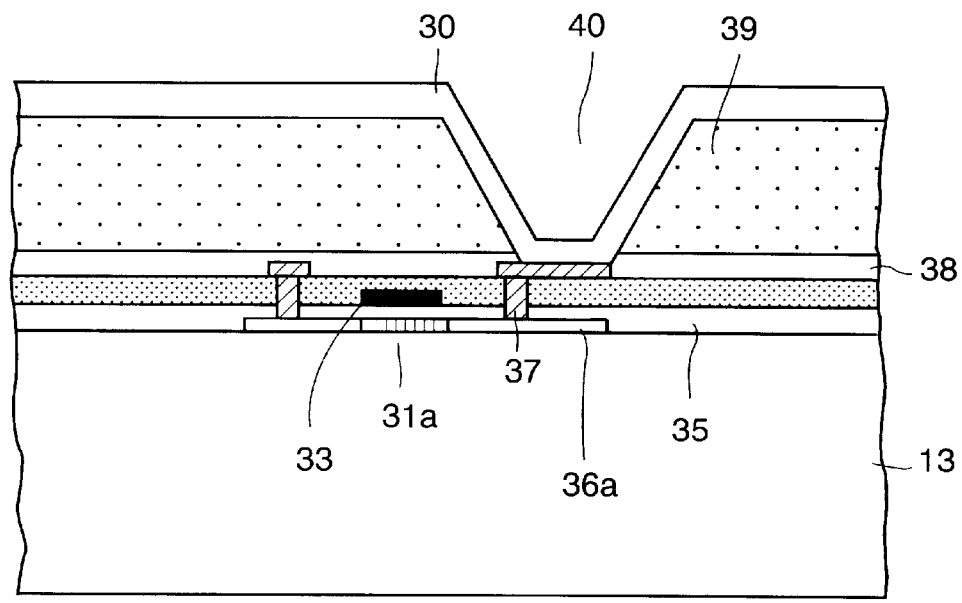
FIG. 7 is a thin film transistor in the second embodiment of the invention.

FIGS. 6 and 7 show a semi-transparent type flat panel display device according to a third embodiment of the present invention. The structure shown in FIG. 6 is also upside-down with respect to that shown in FIG. 7 for the sake of explanation. It should be noted, however, that a liquid crystal layer and a counter substrate are not shown in FIG. 7. The flat panel display device includes a TFT active-matrix liquid crystal device.

The elements or components are substantially the same in structure as shown in FIGS. 3 through 5 except the following.

First, the counter substrate 14 is made as thin as possible, e.g., practically 0.2 mm thick. The polarized light reflection layer 18a with an adhesive film is put on the outer surface of the substrate reverse to the side of the transparent electrode 14 as shown in FIG. 6.

The polarized light reflection layer 18a may be made of a polymerized cholesteric liquid crystal film. Since this reflection layer 18a is not necessary to be thin unlike the reflection layer 18 of the first embodiment, its production yield is better than that of the latter. Although the 0.2 mm thick substrate 14 causes more or less a parallax image, it does not substantially affect the display quality. The 0.2 mm thick substrate 14 is made by grinding thinly a 0.7 mm glass substrate or is made of a plastic substrate.

Secondly, the TFT element on the array substrate is made of a poly-silicon material 36a which is different from the amorphous silicon material of the first embodiment. Since such a poly-silicon TFT generally has a small leak current due to optical excitation, its leak current is negligible even under approximately ten thousands lux of ambient light.

As described above, the polarized light reflection layer 18a is made of the cholesteric liquid crystal material. If the reflection layer 18a is set to be such a helical structure that the helical pitch continuously varies in the layer thickness direction to make the product of the helical pitch and the average refractive index, i.e., "np", (n: average refractive index, and p: helical pitch), equal to all the visible wavelength λ, it suppresses coloration due to wavelength dispersion at the polarized light reflection layer 18a.

The stick-like polymers in the cholesteric liquid crystal constitutes the helical structure so that the Bragg reflection takes place with the wavelength equal to the helical pitch when incident light is in parallel with the helical axis. Namely, the Bragg reflection is brought about when the wavelength bandwidth (wavelength range) is equal to the product "Δnp" of the birefringence (refractive index anisotropy) "Δn" and the helical pitch "p" where the central wavelength is equal to the product "np". In the above relationship, the birefringence "Δn" and the average refractive index "n" are, respectively, given by the following:

$$\Delta n = |n\perp - n\|\|,$$

and $$n = \sqrt{n\perp^2 + n\|\|^2}$$

where n⊥ is the refractive index along the longer axis of the stick-like polymer and n∥ is the refractive index along the shorter axis thereof.

As explained above, those requirements are met if the cholesteric liquid crystal pitch varies in the thickness direction and the polarized light reflection property is proper over the entire visible light region.

Figure 8:
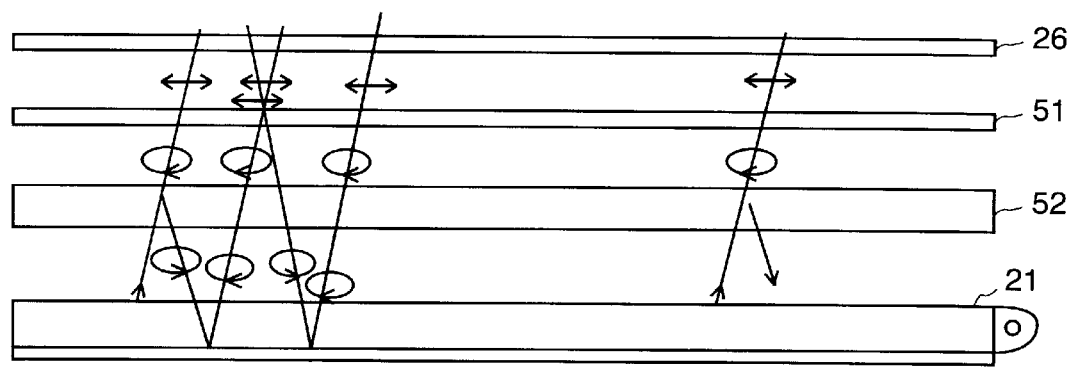
FIG. 8 shows a schematic side view of an optical system added to the previous embodiments of the present invention.

FIG. 8 shows an additional optical system configured to improve the utilization efficiency of light from an illumination light source. The optical system consists of a second retardation plate 51 and a second cholesteric liquid crystal film 52 which are disposed between the illumination light source 21 and the polarizer 26.

In this optical system, a partial component of the light from illumination light source 21 is transformed into linear light in parallel with the polarization axis of the polarizer 26 and its remaining components are effectively recycled. The second cholesteric liquid crystal film 52 in this embodiment has a left-handed helical structure as the cholesteric liquid crystal layer 18 (18*a*). The second retardation plate 51 has a delay axis in parallel with that of the retardation plate 25.

A right-handed circularly polarized light component of the illumination light passes through the cholesteric liquid crystal film 52 while a major left-handed circularly polarized light component reflects from the film 52 but about 10% left-handed circularly polarized light component passes through it. The right-handed circularly polarized light component and the left-handed circularly polarized light component are incident on the retardation plate 51. The retardation plate 51 transforms the former into linearly polarized light with oscillation components in parallel with the polarization axis of the polarizer 26 and the latter into those in parallel with the delay axis thereof. Thus, the left-handed circularly polarized light component transformed through the polarizer 26 and the retardation plate is only incident on the polarized light reflection layer 18 (18*a*).

The left-handed circularly polarized light reflects, by about 90%, on the polarized light reflection layer 18 (18*a*) and is transformed into linearly polarized light through the retardation plate 25. The linearly polarized light passes through the polarizer 26 and reaches to the retardation plate 51. The retardation plate 51 transforms it into right-handed circularly polarized light. The right-handed circularly polarized light then passes through the cholesteric liquid crystal film 52 and reaches to the reflector 23 of the illumination light source 21. The polarized light is resolved by the reflector 23. The above-explained process is repeated so that reflected light returning to the illumination light source 21 is efficiently utilized.

The optical system is not limited to the structure shown in FIG. 8. When the cholesteric liquid crystal film, for example, has a helical rotation direction reversed to this embodiment, the delay axis of the retardation plate 51 is turned by 180° in order to perform substantially the same function as the third embodiment.

The flat panel display device of the present invention achieves high light utilization efficiency both in the cases where it is driven as the light reflection type display by utilizing outer (ambient) light and as the light transparent type display by means of the illumination light source. The flat panel display device does not need to operate the illumination light source as a subsidiary measure at the time of the reflection display nor to increase the brightness of the illumination light source at the time of the transmission display. Thus, its power consumption decreases remarkably.

What we claim is:

1. A flat panel display device, comprising:
   a first polarizer configured to transmit linearly polarized light along its polarization axis;
   a first retarder disposed behind said first polarizer to modulate output light from said first polarizer in response to first and second applied voltages to said first retarder;
   a polarized light reflection layer provided behind said first retarder to selectively reflect a first circularly polarized light component with a predetermined rotation direction;
   a second retardation plate disposed behind said polarized light reflection layer and a second polarizer disposed behind said second retardation plate; and
   a color filter disposed between said first polarizer and said second retardation plate,
   said second retardation plate and said second polarizer transforming incident light from a rear side of said flat panel display device into a circularly polarized light component with the same rotation direction as that of said first circularly polarized light component;
   wherein said first retarder plate transforms the linearly polarized light passing through said first polarizer into the first circularly polarized light component and a second circularly polarized light component with a rotation direction reversed to that of said first circularly polarized light component in response to said first and second applied voltages, respectively, and
   wherein said first retarder plate transforms transmission light passing through said polarized light reflection layer and reflection light reflecting from said polarized light reflection layer into linearly polarized light along the polarization axis of said first polarizer in response to said first applied voltage and transforms the transmission light into linearly polarized light crossing with the polarization axis of said first polarizer in response to said second applied voltage.

2. The flat panel display device according to claim 1 wherein said polarized light reflection layer is a cholesteric liquid crystal layer.

3. The flat panel display device according to claim 2 wherein said cholesteric liquid crystal layer has helical pitches varying in its thickness direction.

4. The flat panel display device according to claim 1 wherein said first retarder plate includes a variable retarder layer to phase-modulate incident light in response to applied voltages and a fixed retarder layer to phase-modulate incident light by a fixed phase.

5. The flat panel display device according to claim 4 wherein said retarder layer is disposed closer to said variable polarized light reflection layer than said fixed retarder layer.

6. The flat panel display device according to claim 1 wherein said variable retarder layer includes electrodes to which the first and second voltages are applied and a liquid crystal layer provided between said electrodes.

7. The flat panel display device according to claim 4 wherein said retarder layer changes a phase of its incident light by $\lambda/2$ in the first applied voltage than in the second applied voltage where $\lambda$ is a wavelength of the incident light.

8. The flat panel display device according to claim 7 wherein said retarder layer is a twisted nematic liquid crystal layer.

9. The flat panel display device according to claim 7 wherein said retarder layer is a vertical alignment type twisted nematic liquid crystal layer.

10. The flat panel display device according to claim 7 wherein said retarder layer is a horizontal alignment type twisted nematic liquid crystal layer.

11. The flat panel display device according to claim 1 further comprising a surface light source on a side of said polarized light reflection layer that is opposite from a side with said first retarder.

12. The flat panel display device according to claim 6 wherein said fixed retarder layer comprises a $\lambda/4$ retardation plate of which delay axis defines about 45° with respect to the polarization axis of said first polarizer viewed from a front surface thereof, said variable retarder layer include liquid crystal cells to modulate its incident light in response to the first and second applied voltages, and said polarized light reflection layer includes a cholesteric liquid crystal layer.

13. The flat panel display device according to claim 12 wherein said liquid crystal cells include a liquid crystal layer and a pair of electrodes formed on inner surfaces of said liquid crystal cells to hold said liquid crystal layer.

14. The flat panel display device according to claim 13 wherein said cholesteric liquid crystal layer is formed on an inner surface of said liquid crystal cells.

15. The flat panel display device according to claim 14 wherein said cholesteric liquid crystal layer is formed on an outer surface of said liquid crystal cells.

16. The flat panel display device according to claim 15 wherein said cholesteric liquid crystal layer is made of a polymer cholesteric liquid crystal film.

17. The flat panel display device according to claim 13 wherein one of said pair of electrodes includes pixel electrodes disposed in a matrix form, and switching elements connected to said electrode, and the other one of said pair of electrodes include a counter electrode commonly used for a plurality of said pixel electrodes.

18. The flat panel display device according to claim 12 wherein said cholesteric liquid crystal layer has a helical direction reversed to a rotation direction of the 45° which the delay axis defines with the polarization axis.

* * * * *